(12) United States Patent
Kalivarapu et al.

(10) Patent No.: US 11,413,951 B2
(45) Date of Patent: Aug. 16, 2022

(54) METHOD FOR DETECTING HEATER CORE ISOLATION VALVE STATUS

(71) Applicant: Ford Global Technologies, LLC, Dearborn, MI (US)

(72) Inventors: Sridhar Kalivarapu, Canton, MI (US); Robert Roy Jentz, Westland, MI (US); Athira Vilson, Shelby Township, MI (US); Herbert Thomas Meissner, South Lyon, MI (US); Sitaram Rejeti, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 452 days.

(21) Appl. No.: 16/432,849

(22) Filed: Jun. 5, 2019

(65) Prior Publication Data

US 2020/0384845 A1 Dec. 10, 2020

(51) Int. Cl.
| | | |
|---|---|---|
| B60K 6/24 | (2007.10) | |
| B60K 11/02 | (2006.01) | |
| F01P 3/20 | (2006.01) | |
| F01P 7/14 | (2006.01) | |
| F02D 41/00 | (2006.01) | |
| F02D 41/22 | (2006.01) | |
| F02M 26/30 | (2016.01) | |
| F02M 26/32 | (2016.01) | |
| G07C 5/08 | (2006.01) | |

(52) U.S. Cl.
CPC ............... *B60K 6/24* (2013.01); *B60K 11/02* (2013.01); *F01P 3/20* (2013.01); *F01P 7/14* (2013.01); *F02D 41/0055* (2013.01); *F02D 41/22* (2013.01); *F02M 26/30* (2016.02); *F02M 26/32* (2016.02); *G07C 5/0808* (2013.01); *B60Y 2200/92* (2013.01); *B60Y 2306/05* (2013.01); *F01P 2007/146* (2013.01); *F01P 2060/00* (2013.01)

(58) Field of Classification Search
CPC .......... F01P 3/20; G07C 5/0808; F02D 41/22
USPC ..................................................... 123/568.12
See application file for complete search history.

(56) References Cited

U.S. PATENT DOCUMENTS

| | | | | |
|---|---|---|---|---|
| 5,036,803 | A * | 8/1991 | Nolting | ................... F01P 7/026 123/41.1 |
| 5,792,949 | A * | 8/1998 | Hewelt | ................. G01M 3/025 123/41.86 |
| 6,155,296 | A * | 12/2000 | Roman | .............. B60H 1/00485 137/625.29 |
| 6,463,892 | B1 | 10/2002 | Russell | |
| 9,259,990 | B2 * | 2/2016 | Ishii | ................... B60H 1/00485 |
| 9,260,103 | B2 | 2/2016 | Porras et al. | |
| 10,207,567 | B2 | 2/2019 | Porras | |
| 10,385,760 | B2 * | 8/2019 | Quevallier | ............. F01P 11/028 |

(Continued)

*Primary Examiner* — Phutthiwat Wongwian
*Assistant Examiner* — Arnold Castro
(74) *Attorney, Agent, or Firm* — Vincent Mastrogiacomo; McCoy Russell LLP

(57) ABSTRACT

Methods and systems are provided for a vehicle coolant circuit. In one example, the coolant circuit includes a heater core isolation valve (HCIV) where a status of the HCIV may be diagnosed by intrusively activating a positive temperature coefficient heater in a cooling loop in which the HCIV is arranged. A response of coolant temperature to heater activation may be used to determine a position of the HCIV.

20 Claims, 5 Drawing Sheets

(56) References Cited

U.S. PATENT DOCUMENTS

| | | | |
|---|---|---|---|
| 2003/0127528 A1* | 7/2003 | Sabhapathy | F01P 3/20 |
| | | | 237/12.3 B |
| 2010/0218916 A1* | 9/2010 | Miller | F01P 7/165 |
| | | | 165/104.11 |
| 2011/0100307 A1* | 5/2011 | Moffat | F01P 7/165 |
| | | | 123/41.1 |
| 2012/0215429 A1* | 8/2012 | Yumisashi | B60W 30/192 |
| | | | 701/112 |
| 2013/0255605 A1 | 10/2013 | Jentz et al. | |
| 2014/0000859 A1* | 1/2014 | Abihana | F01P 7/167 |
| | | | 165/202 |
| 2014/0109872 A1* | 4/2014 | Porras | B60H 1/034 |
| | | | 123/435 |
| 2014/0110081 A1 | 4/2014 | Porras | |
| 2016/0102601 A1* | 4/2016 | Hosokawa | F01P 7/14 |
| | | | 123/41.08 |
| 2016/0138530 A1* | 5/2016 | Lee | F02M 26/22 |
| | | | 123/568.12 |
| 2017/0030274 A1* | 2/2017 | Nakanishi | F01P 11/16 |
| 2019/0145359 A1* | 5/2019 | Quix | F02M 26/17 |
| | | | 123/568.12 |
| 2020/0182127 A1* | 6/2020 | Lee | F01P 7/165 |
| 2020/0332703 A1* | 10/2020 | Yokoyama | F01P 3/02 |

\* cited by examiner

METHOD FOR DETECTING HEATER CORE ISOLATION VALVE STATUS

FIELD

The present description relates generally to methods and systems for a coolant circuit of a vehicle propulsion system.

BACKGROUND/SUMMARY

A plug-in hybrid electric vehicle (PHEV) may include more than one method for providing passenger cabin heating to accommodate an operating mode of the PHEV. For example, the PHEV may have a primary coolant circuit that flows coolant through both an engine cooling loop and a heating loop when the PHEV is energized by fuel combustion, utilizing waste heat from an engine system of the PHEV to warm the passenger cabin. The secondary coolant circuit may include circulating coolant through the heating loop and not the engine cooling loop and a path of coolant flow may be controlled by a heater core isolation valve (HCIV). The HCIV may be adjustable between coupling the engine cooling loop and the heating loop or a isolating the engine cooling loop from the heating loop.

In some examples, an exhaust gas recirculation (EGR) cooler may be included in the engine cooling loop. The EGR cooler may receive a portion of a flow of coolant that has circulated through the engine block and utilize heat extraction provided by the coolant to reduce a temperature of EGR gases before the gases are delivered to the engine block for combustion. When the engine cooling loop is coupled to the heating loop, coolant may flow from the EGR cooler to the heating loop where heat absorbed by the coolant is exchanged at a heater core and used to warm the passenger cabin. When the engine cooling loop is decoupled from the heating loop, coolant may instead flow from the EGR cooler to a degas bottle configured to de-aerate the coolant before the coolant is recirculated to the engine.

In some instances, the HCIV may become stuck in a position that isolates the engine cooling loop from the heating loop. As a result, heated coolant from the EGR cooler may not be cooled by heat exchange in the heating loop. An ability of the EGR cooler to cool EGR gases may degrade, leading to termination of EGR flow. Stopping EGR flow may cause an undesirable increase in levels of carbon monoxide, nitrogen oxides, particulate matter, and non-methane hydrocarbons in the exhaust gases released to the atmosphere from the vehicle's exhaust system. Thus, detecting when the HCIV is degraded and stuck in one position may circumvent halting of EGR flow. However, monitoring of a status of the HCIV is obfuscated by a lack of a position feedback mechanism.

One example attempt to detect a position of a HCIV is shown by Porras in U.S. Pub. No. 2014/0110081. Therein, a fault in a HCIV of a PHEV, when the HCIV is actuated to a position coupling a primary cooling circuit of an engine to a secondary cooling circuit, is detected by monitoring responses of temperature sensors to a position of the HCIV and a status of a vehicle heating system. A valve system of a vehicle selectively directs coolant from an engine to a heat exchanger and is configured to detect a position of the HCIV based on a comparison of coolant temperature entering the heat exchanger to coolant temperature exiting the engine.

However, the inventors herein have recognized potential issues with such systems. As one example, the method of Porras may be incorporated into an emission diagnostic trouble code and add to a warranty cost of the vehicle. Furthermore, the diagnosis may not mitigate heating of coolant by an EGR cooler and delivery of the heated coolant to a degas bottle. Thermal degradation of EGR system components may occur, leading to costly repairs.

In one example, the issues described above may be addressed by a method for a vehicle, including transferring heat from an EGR cooler of an engine cooling loop to a heater core of a heating loop by flowing coolant through both the engine cooling loop and the heating loop, the engine cooling loop coupled to the heating loop by a valve arranged in the heating loop, commanding the valve to a first position based on generation of torque at the engine, activating a positive temperature coefficient (PTC) heater in the heating loop following commanding of the valve to the first position, inferring an actual position of the valve responsive to coolant temperature in the heating loop following heater activation, and indicating valve degradation based on the actual position being different from the commanded position. In this way, a degraded HCIV may be detected before degradation of engine cooling loop components occurs.

As one example, a temperature of the coolant flowing through the heating loop may spike above a threshold temperature when the heater is activated intrusively while the valve is in the second position. The temperature spike may be indicative of an inability of the HCIV to be adjusted to the first position to fluidly couple the heating loop to the engine cooling loop. Responsive to determination of HCIV degradation, mitigating actions may be performed, such as, for example, reducing EGR flow to circumvent thermal fatigue of an EGR cooler arranged in the engine cooling loop, as well as displaying an alert. In this way, repair and/or replacement of the HCIV may be implemented before engine components degrade and emission of undesirable combustion byproducts increases.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
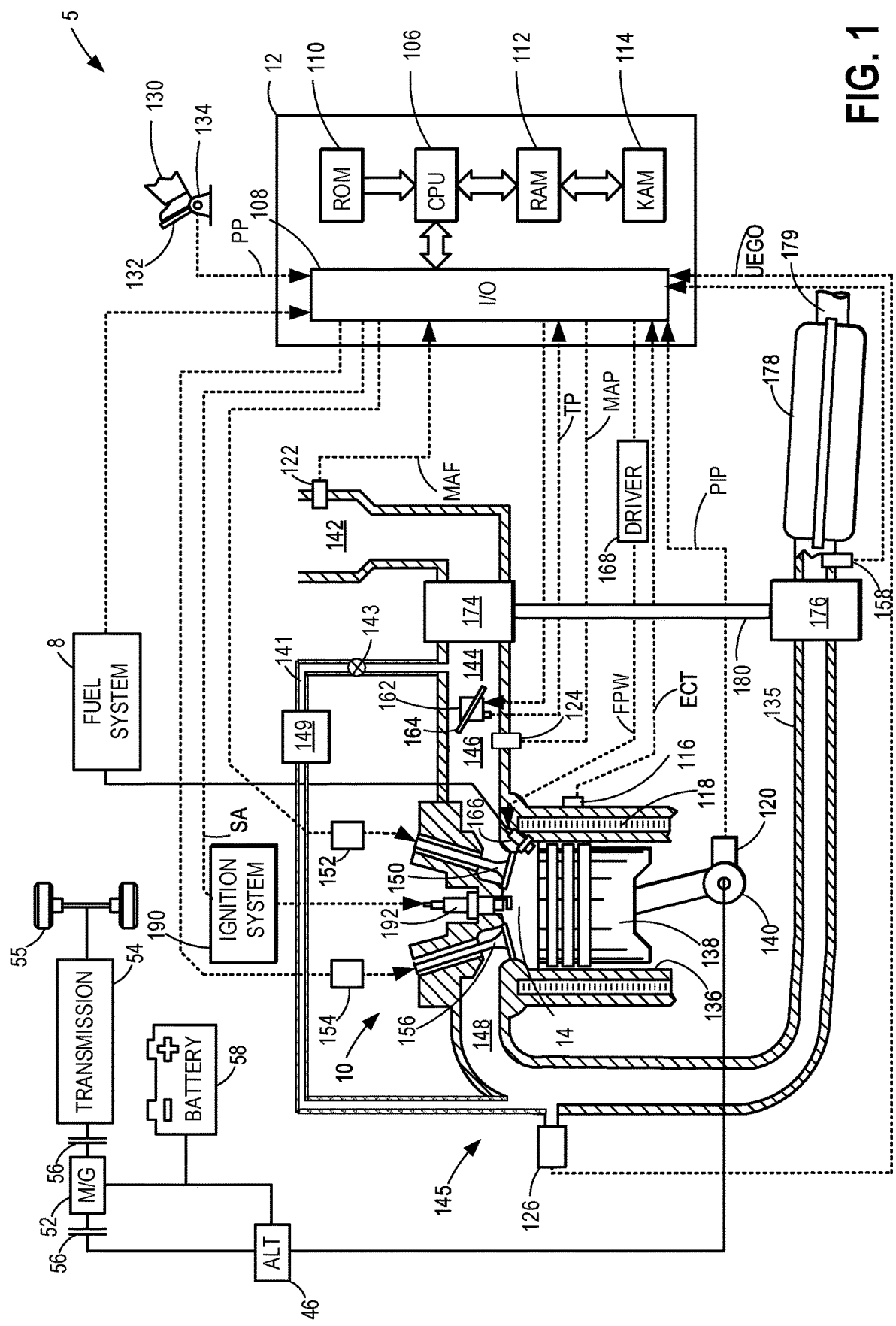
FIG. 1 shows an example of an engine system configured to be cooled by a cooling system.
Figure 2:
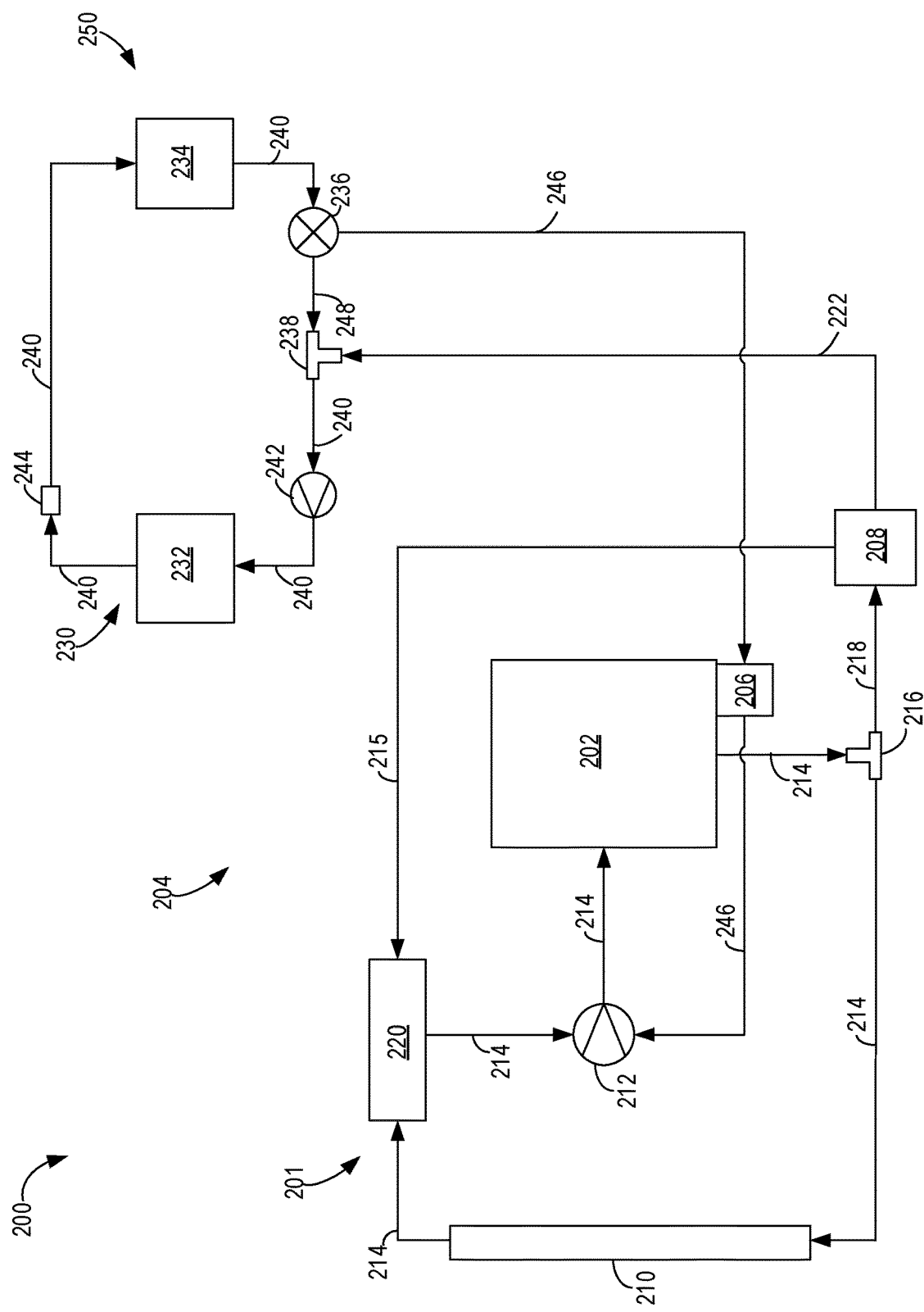
FIG. 2 shows an example of a cooling system of a PHEV including a primary cooling circuit and a secondary cooling circuit.
Figure 3:
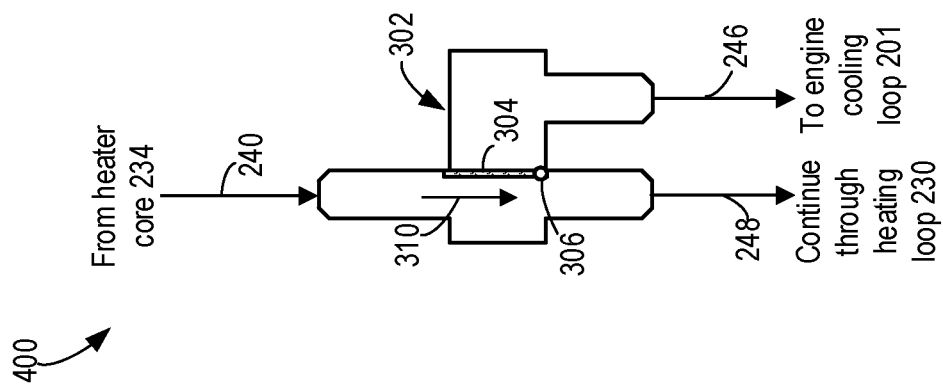
FIG. 3 shows an example of a heater core isolation valve (HCIV), which may be included in the cooling system of FIG. 2, arranged in a first position.
Figure 4:
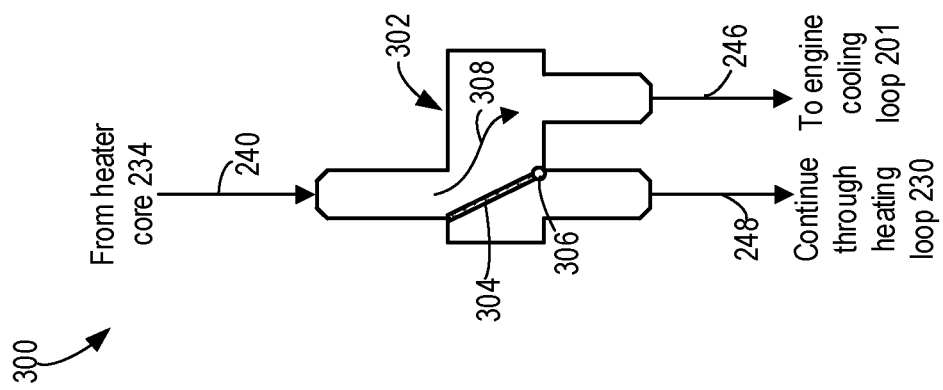
FIG. 4 shows the example of the HCIV arranged in a second position.
Figure 5:
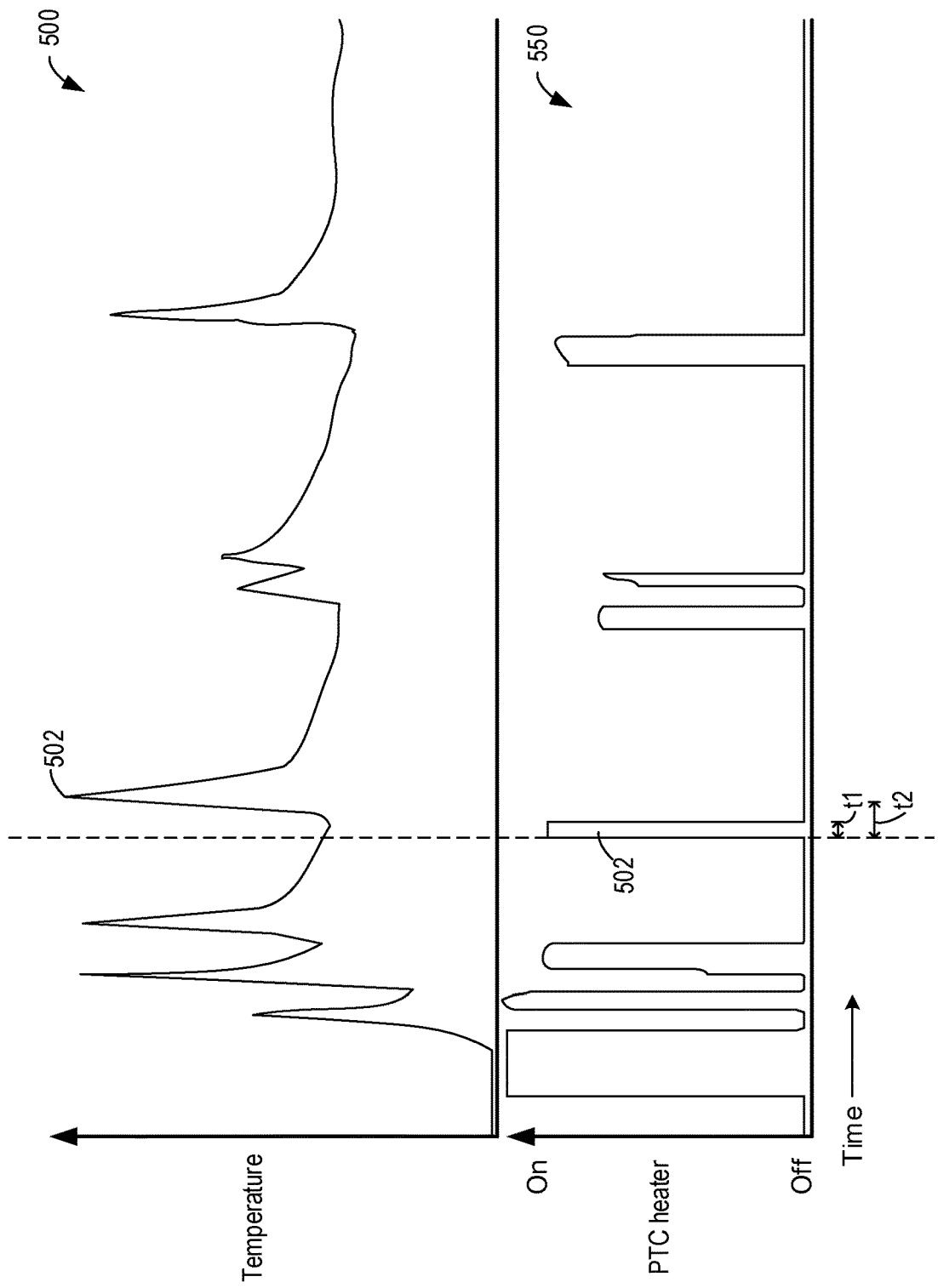
FIG. 5 shows examples of plots depicting changes in an engine coolant temperature and a status of a positive temperature coefficient (PTC) heater over time during implementation of a method for diagnosing a heater core isolation valve (HCIV).
Figure 6:
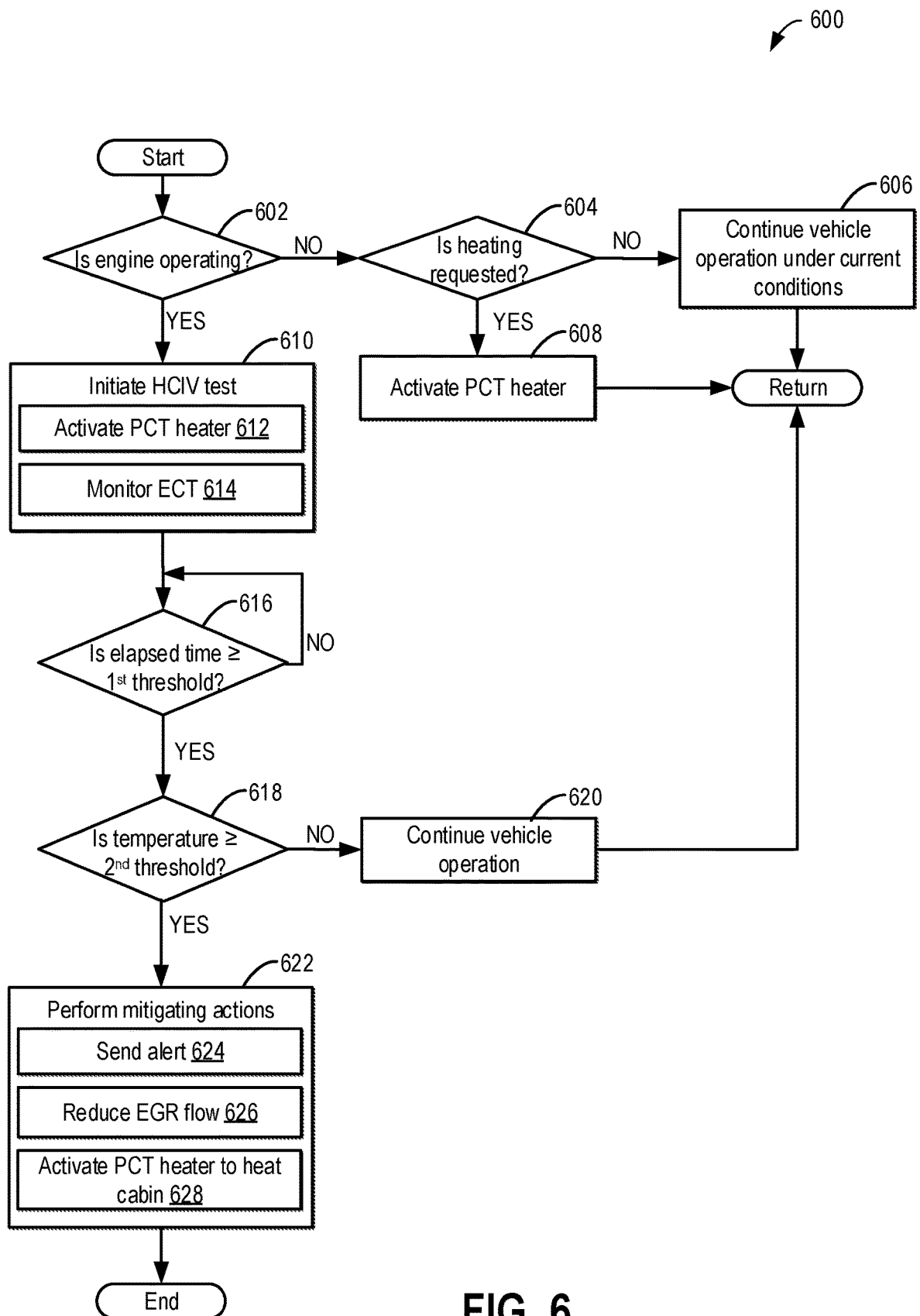
FIG. 6 shows an example of a method for detecting a position of an HCIV.

The following description relates to systems and methods for determining a status of a heater core isolation valve (HCIV). Determining the status of the HCIV includes diagnosing a position of the HCIV, adjustable between a first position that directs coolant flow through a primary circuit and a second position that directs coolant flow through a secondary circuit. The HCIV may be included in a plug-in hybrid electric vehicle (PHEV), relying on both a traction battery and an internal combustion engine to propel the vehicle. An example of an engine system that may be implemented in the PHEV is shown in FIG. 1. The engine system may be cooled by a portion of a coolant system that forms an engine cooling loop, configured to circulate a coolant through various components of the engine system. The primary circuit may include both the engine cooling loop and a heating loop, the loops fluidly coupled to one another. As the coolant flows through the primary circuit when the PHEV engine is operating, heat is extracted from the engine block, a temperature of EGR gases is reduced, and heat is removed from the coolant as the coolant flows through the heating loop. The coolant system may also have a secondary circuit that flows the coolant solely through the heating loop when the PHEV is operating in an electric mode. The engine cooling loop and the heating loop may be linked by an HCIV, as shown in a schematic diagram of the coolant system in FIG. 2. An example of an HCIV is shown in FIGS. 3 and 4, alternating between a first position and a second position, the positions controlling flow of coolant through either the primary circuit or the secondary circuit. During events where the HCIV becomes stuck in a position, e.g., the second position, that isolates the engine cooling loop from the heating loop, a status of the HCIV may be detected by intrusively activating a positive temperature coefficient (PTC) heater in the heating loop and monitoring an engine coolant temperature (ECT) in response to heating by the PTC heater. A response of the ECT to activation of the PTC heater when the HCIV is stuck in the second position is illustrated in exemplary plots in FIG. 5, depicting an effect of PTC heater activation on ECT relative to time. An example of a method for determining the position of the HCIV is shown in FIG. 6.

FIGS. 3-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In a PHEV, heating of a passenger cabin may not rely solely on waste heat from an engine system components, such as an engine and/or an EGR cooler, due to frequent operation of the PHEV in an electric mode, without the engine running. When the PHEV is in the electric mode, the PHEV may utilize a heating loop that forms a secondary circuit of coolant flow. The heating loop may also be included in a primary circuit where the heating loop is fluidly coupled to an engine cooling loop that extracts heat from the engine and cools EGR gases. The heating loop includes, amongst other components, a PTC heater that operates based on electrical energy. The PTC heater may be a heat source for the heating loop, converting electrical energy to thermal energy that is transferred to coolant flowing through the heating loop. The heat absorbed by the coolant is exchanged at a heater core and used to heat the passenger cabin.

The PTC heater may be a self-regulating heater that does not rely on an external diagnostic controls and provides faster and more uniform heating than conventional wire or coil-based heaters. The PTC heater may be formed of a material that increasingly resists current as a temperature of the PTC heater rises, thereby reducing a potential for overheating. Implementation of the PTC heater in the heating loop may be leveraged to provide feedback regarding a position of an HCIV in the circuit, e.g., a direction of flow through the HCIV, allowing efficient diagnosis of an operating condition of the HCIV. Details of a method for detecting the position of the HCIV, thereby decreasing a likelihood of thermal degradation of engine components such as an EGR cooler, is provided further below, with reference to FIGS. 2-6.

Turning now to the figures, FIG. 1 depicts an example of a cylinder 14 of an internal combustion engine 10, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 via a transmission 54, as further described below. Further, a starter motor (not shown) may be coupled to crankshaft 140 via a flywheel to enable a starting operation of engine 10.

Cylinder 14 may be cooled by a cooling sleeve 118 that circumferentially surrounds cylinder 14 and flows a coolant therethrough. The cooling sleeve 118 may be included in a coolant system that circulates coolant through various components of the engine 10 to provide cooling and heat exchange and may regulate engine temperature and utilization of waste heat. An example of a coolant system which may be coupled to the engine 10 is shown in FIG. 2 and described further below.

In some examples, vehicle 5 may be a hybrid vehicle, such as a plug-in hybrid electric vehicle (PHEV), with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

An exhaust system 145 is coupled to cylinder 14 via a poppet valve 156. The exhaust system includes an exhaust manifold 148, an emission control device 178, and exhaust tail pipe 179. Exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a $NO_x$, a HC, or a CO sensor, for example. In the example of FIG. 1, exhaust gas sensor 126 is a UEGO. Emission control device 178 may be a three-way catalyst, a $NO_x$ trap, various other emission control devices, or combinations thereof.

Engine 10 may further include one or more exhaust gas recirculation passages for recirculating a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and $NO_x$ emissions. In the depicted embodiment, exhaust gas may be recirculated from exhaust manifold 148 to intake passage 144 via EGR passage 141. The amount of EGR provided to intake passage 144 may be varied by controller 12 via EGR valve 143. In other examples, engine 10 may be configured to also provide low pressure EGR (not shown in FIG. 1) being provided via an LP-EGR passage coupled between the engine intake upstream of the turbocharger compressor 174 and the engine exhaust downstream of the turbine 176.

Furthermore, when the engine 10 is operating and generating exhaust gas, heat from the EGR gases may be extracted through an EGR cooler 149, arranged in the EGR passage 141 in a path of gas flow. The EGR cooler 140 may be a heat exchanger, utilizing cooling by air-to-liquid heat exchange, as an example. Coolant may flow through the EGR cooler 149, absorbing heat from the hot gases and flowing to a heater core where the heat is extracted from the coolant via liquid-to-air heat exchange and directed to a passenger cabin to heat the cabin. Heat transfer between the EGR gases and an engine coolant system is described further below with reference to FIG. 2. It will be appreciated that while the EGR cooler 149 is shown in FIG. 1 upstream of the EGR valve 143, other examples may include the EGR cooler 149 arranged downstream of the EGR valve 143 or in another region of the EGR passage 141.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used.

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal FPW received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

In an alternate example, fuel injector 166 may be arranged in an intake passage rather than coupled directly to cylinder 14 in a configuration that provides what is known as port injection of fuel (hereafter also referred to as "PFI") into an intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Fuel injector 166 may be configured to receive different fuels from fuel system 8 in varying relative amounts as a fuel mixture and further configured to inject this fuel mixture directly into cylinder. Further, fuel may be delivered to cylinder 14 during different strokes of a single cycle of the cylinder. For example, directly injected fuel may be delivered at least partially during a previous exhaust stroke, during an intake stroke, and/or during a compression stroke. As such, for a single combustion event, one or multiple injections of fuel may be performed per cycle. The multiple injections may be performed during the compression stroke, intake stroke, or any appropriate combination thereof in what is referred to as split fuel injection.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to the cooling sleeve 118; an exhaust gas temperature from a temperature sensor 158 coupled to exhaust passage 135; a profile ignition pickup signal (PIP) from a Hall effect sensor 120 (or other type) coupled to crankshaft 140; throttle position (TP) from a throttle position sensor; signal UEGO from exhaust gas sensor 126, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Controller 12 receives signals from the various sensors of FIG. 1 and employs the various actuators of FIG. 1 to adjust engine operation based on the received signals and instructions stored on a memory of the controller. For example, the controller may obtain the ECT from the temperature sensor 116 and adjust a flow of coolant circulating through the cooling sleeve 118 based on the ECT.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

When the engine 10 of FIG. 1 is implemented in a PHEV, the PHEV may operate as a hybrid electric vehicle with an ability to connect to an external electric grid. The PHEV may be driven over a range propelled by the electric machine 52, powered by the battery 58, and switch to the engine 10 when the battery 58 is depleted below a threshold power level. When the engine 10 is not operating, heat is not generated and as a result passenger cabin heating may not be obtained through waste heat from the engine 10 or from the EGR cooler 149. As an alternative, the PHEV may have a coolant system that includes a primary circuit where an engine cooling loop and a heating loop are fluidly coupled through an HCIV, providing cabin heating by using waste heat from the engine, and a secondary circuit, where the engine cooling loop and the heating loop are isolated from one another and cabin heating is enabled by an electric heater. An example of such a coolant system is shown in FIG. 2.

In FIG. 2, a schematic diagram of a coolant system 200 of a PHEV is depicted. The coolant system may be coupled to an engine 202, such as the engine 10 of FIG. 1, and may provide cooling to combustion chambers of the engine 202 by flowing a coolant through a water jacket or cooling sleeve, such as the cooling sleeve 118 of FIG. 1. The coolant may be glycol, an aqueous glycol solution, or some other type of coolant with a lower freezing point than water. The coolant system 200 has two distinct circuits: a primary circuit 204 that flows coolant through both an engine cooling loop 201 and a heating loop 230 and a secondary circuit 250 formed exclusively of the heating loop 230. The engine cooling loop 201 includes components such as the engine 202, an engine oil cooler 206, an EGR cooler 208, and a radiator 210 and the heating loop 230 includes a PTC heater 232, a heater core 234, and a HCIV 236. The primary circuit 204 may be configured to both cool the engine 202 and provide heating to a passenger cabin of the PHEV when heating is requested and the engine 202 is operating. The secondary circuit 250 may provide heating to the passenger cabin when the engine is not running and the PHEV is operating in an electric mode.

The engine cooling loop 201 includes a main pump 212 that drives coolant flow through the primary circuit 204 as indicated by arrows 214. The main pump 212 may be mechanically or electrically driven. For example, the coolant may flow from the pump to the engine 202. After circulating through the engine 202 and extracting heat from the engine 202, the flow may be directed to a first three-way junction 216 that splits the flow of heated coolant. A first portion of coolant flow may be directed to the radiator 210, as indicated by arrows 214, and a second portion directed to the EGR cooler 208, as indicated by arrow 218.

The first portion of the coolant flow may flow through the radiator 210 where heat from the coolant may be transferred to the radiator 210. In some examples, the heat absorbed by the radiator may be channeled to the passenger cabin to assist in warming the cabin. The first portion of the coolant flow may flow from the radiator 210 to a degas bottle 220 where the coolant may be de-aerated before returning to the main pump 212.

The second portion of the coolant flow may flow from the first three-way junction 216 to the EGR cooler 208 and extract heat from EGR gases flowing therethrough. When the PHEV is operating with the engine 202 running and flowing coolant through the primary coolant circuit 204, the second portion of the coolant flow may continue from the EGR cooler 208 to the heating loop 230, as indicated by arrow 222. The coolant enters the heating loop 230 at a second three-way junction 238 and flows along a path indicated by arrows 240.

An auxiliary pump 242 may be positioned downstream of the second three-way junction 238, driving coolant flow through the heating loop 230. The auxiliary pump 242 may be electrically or mechanically driven. Coolant is pumped to the PTC heater 232, which, as described above, may be an electric, self-regulating heater. When the PHEV engine 202 is operating and coolant is flowing through the primary circuit 204, passenger cabin heating may be provided by heat extracted from the EGR gases at the EGR cooler 208. The coolant is already heated upon arrival at the PTC heater 232 and the PTC heater 232 is not activated. However, during engine cold starts, when the engine 202 is operating and coolant is flowing through the primary circuit 204, the engine 202 may not be sufficiently warm to provide passenger cabin heating. The PTC heater 232 may be turned on to heat the coolant in the heating loop 230 until the engine 202 reaches a threshold operating temperature, enabling the PTC heater 232 to be deactivated.

The coolant flows from the PTC heater 232 to the heater core 234. An ECT sensor 244 may be arranged in the path of coolant flow between the PTC heater 232 and the heater core 234 to monitor a temperature of the coolant prior to interaction with the heater core 234. The heater core 234 may be a heat exchange device that extracts heat from the coolant, transfers the heat to air, and directs the absorbed heat to the passenger cabin. For example, a blower may be arranged adjacent to the heater core 234, utilizing liquid-to-air heat exchange across the heater core 234 to funnel heated air into the passenger cabin. A temperature of the coolant emerging from the heater core 234 is therefore reduced relative to the coolant entering the heater core 234.

The cooled coolant flows from the heater core 234 to the HCIV 236. The HCIV 236 may be a three-way valve that may be varied between at least two positions. For example, a non-limiting example of the HCIV 236 of FIG. 2 is shown in FIGS. 3 and 4 by an HCIV 302 arranged in a first position 300 in FIG. 3 and a second position 400 in FIG. 4. The HCIV 302 may be implemented in the coolant system 200 of FIG. 2 and configured to alternate between directing coolant flow through the primary circuit 204 and the secondary circuit 250 of FIG. 2. The HCIV 302 has a pivotable partition 304 that rotates about a hinge 306. Adjustment of the partition 304 between the first position 300 and the second position 400 may be actuated by an electric, electromagnetic, or hydraulic device, or some other type of actuating mechanism.

In the first position 300 shown in FIG. 3, the partition 304 is oriented so that flow from the heater core 234 of FIG. 2 passes through the HCIV 302, as indicated by arrow 308, along a continuous path that fluidly couples the heating loop 230 to the engine cooling loop 201 of FIG. 2, thereby flowing coolant through the primary circuit 204. The position of the partition 304 interrupts flow around the heating loop 230 so that coolant is forced to divert along the direction indicated by arrow 246 to circulate through the engine cooling loop 201 of FIG. 2 before returning to the heating loop 230. In the second position 400 shown in FIG. 4, the partition 304 is pivoted in a clockwise direction, blocking flow from the heater core 234 to the engine cooling loop 201. Instead, coolant flows through the HCIV 302 as indicated by arrow 310 to continue circulating through the heating loop 230, e.g., through the secondary circuit 250.

Returning to FIG. 2, when the HCIV 236 is adjusted to a first position, e.g., the first position 300 of FIG. 3, coolant may flow from the heater core 234, through the HCIV 236 and to the engine oil cooler 206 via arrows 246 while blocking flow between the heater core 234 and the second three-way junction 238. Coolant flow may be driven by operation of the main pump 212 and the auxiliary pump 242 may be deactivated unless a speed of the main pump 212 drops below a threshold speed, e.g., the main pump 212 becomes degraded. Thus the coolant is forced to flow from the heating loop 230 to the engine cooling loop 201 via arrows 246 and from the engine cooling loop 201 to the heating loop 230 via arrow 222. The first position allows the engine cooling loop 201 and the heating loop 230 to be combined and fluidly coupled. Alternatively, when adjusted to a second position, e.g, the second position 400 of FIG. 4, coolant flow between the heater core 234 and the engine oil cooler 206 is inhibited and coolant instead flows through the HCIV 236 to the second three-way junction 238, as indicated by arrow 248, confining coolant circulation within the heating loop 230, as indicated by arrows 240. In this position, the heating loop 230 is isolated from the engine cooling loop 201 and coolant is circulated through the secondary circuit 250 while the PHEV is operating in the electric mode and the engine 202 is not running.

During electric mode operation of the PHEV, cooling of the engine 202 and of EGR gases at the EGR cooler 208 may not be demanded or may be at least reduced. Flow between the EGR cooler 208 and the heating loop 230 may therefore be discontinued without resulting in an increase in coolant temperature that may lead to thermal degradation of components of the engine cooling loop 201. The second portion of coolant, flowing from the engine 202 through the first three-way junction 216 and to the EGR cooler 208, may flow to the degas bottle 220, as indicated by arrow 215, instead of to the heating loop 230, as indicated by arrow 222, when the HCIV 236 is in the second position.

As elaborated above, the HCIV 236 may be adjusted to the second position during electric mode operation, isolating the heating loop 230 from the engine cooling loop 201. Flow through the heating loop 230 is driven by operation of the auxiliary pump 242. The PTC heater 232 may be activated to heat the coolant as the coolant passes through. The heated transferred to the coolant from the PTC heater 232 is extracted from the coolant at the heater core 234, providing heat for warming the passenger cabin. In this way, the heating loop 230 may heat the passenger cabin without relying on waste heat from the engine cooling loop 201.

If the HCIV 236 is degraded and becomes stuck in the second position, blocking coolant flow between the engine cooling loop 201 and the heating loop 230 during engine operation when engine cooling is desired, the engine cooling loop 201 and the heating loop 230 may remain isolated from one another. Without detection of a status of the HCIV 236, heated coolant may be forced to flow from the EGR cooler 208 to the degas bottle 220, as indicated by arrow 215, which may alter a pressure of the degas bottle 220 and adversely affect an ability of the degas bottle 220 to maintain an air-free volume of coolant within the coolant system 200.

Furthermore, if the HCIV 236 is stuck in the second position, isolating the engine cooling loop 201 from the heating loop 230, coolant circulating through the EGR cooler 208 may increase in temperature, reducing a capacity to cool EGR gases. Detection of insufficient cooling of EGR gases, by, for example a rise in intake manifold temperature, may lead to termination of EGR flow and an increase in carbon monoxide, nitrogen oxides, particulate matter, and non-methane hydrocarbon emissions of the PHEV. Additionally, lack of heat extraction from the coolant via the heating loop 230 may result in local boiling within the engine cooling loop 201 that may impose thermal stress on the EGR cooler 208. A position of the HCIV 236, e.g., whether the HCIV 236 is in the first or second position when coolant flow through the primary circuit 204, e.g., when the heating loop 230 and the engine cooling loop 201 are combined, is requested, may be assessed by a method including briefly activating the PTC heater 232 and monitoring an effect of the activation on a coolant temperature in the heating loop 230. When the HCIV 236 is in a commanded position for circulation through the primary circuit 204, e.g., the first position 300 of FIG. 3 which enables coolant to flow through both the engine cooling loop 201 and the heating loop 230, turning the PTC heater 232 on for a short time duration, such as between 10-30 seconds, may not cause a detectable change in coolant temperature in the heating loop 230, as measured by the ECT sensor 244. Changes in coolant temperature due to activation of the PTC heater 232 may not be detected until the PTC heater 232 is heating coolant flowing therethrough for greater than, for example, one minute, due to coolant inertia as the coolant circulates through the primary circuit, as well as a hysteresis effect on coolant temperature as the coolant flows through more than one heat exchanger.

However, if the HCIV 236 is in the second position, interrupting coolant flow between the engine cooling loop 201 and the heating loop 230, in spite of active engine operation and a command to adjust the HCIV 236 to the first position, the auxiliary pump 242 may be inactive. As a result, the coolant in the isolated heating loop 230 may become stagnant. The coolant in the heating loop 230 does not receive heated coolant from the EGR cooler 208 and does not flow through more than one heat exchanger. Coolant inertia is reduced due to confinement within the heating loop 230 and lack of pumping.

During operation with the HCIV 236 in the first position, the PTC heater 232 may be maintained off when coolant flows through the primary circuit 204 (except during cold engine starts when passenger cabin heating is requested, as described above). However, intrusively activating the PTC heater 232, e.g., turning on the PTC heater 232 even though coolant heating by the PTC heater 232 is not requested, for 30 seconds or less may rapidly generate a detectable spike in the coolant temperature as measured by the ECT sensor 244 when the auxiliary pump 242 is not operating.

Even during instances where the PTC heater 232 is commanded to turn on to provide passenger cabin heating, such as during cold engine starts where the engine is not yet warm enough, while the coolant is flowing through the primary circuit 204, a position of the HCIV 236 may be quickly assessed. As described above, a change in coolant temperature that persists beyond a threshold period of time, such as beyond 60 seconds, may be delayed for at least a minute when the coolant is circulating through the primary circuit 204. However, if the HCIV 236 is stuck in the second position, e.g., the second position 400 of FIG. 4, and the coolant is instead circulating through the secondary circuit 250, a sharp increase in temperature may be observed within 30-60 seconds of the PTC heater 232 activation.

As an example, stacked plots 500 and 550 are shown in FIG. 5. Plot 500 depicts a coolant temperature in a heating loop of a coolant system, such as the heating loop 230 of FIG. 2, as detected by a temperature sensor, such as the ECT sensor 244, positioned immediately downstream of a PTC heater, such as the PTC heater 232 of FIG. 2. Plot 550 illustrates a status of the PTC heater, alternating between turning on and heating coolant and turning off. Both plots 500 and 550 are plotted against time along the x-axis.

A response of coolant temperature to PTC heater activity is shown at, for example, a first activation pulse 502 of the PTC heater in plot 550 where the PTC heater is turned on and turned off after a preset period of time. The first activation pulse 502 may occur over a first interval of time t1 such as 10 seconds or 20 seconds, or between 5 to 30 seconds. By the end of the first activation pulse 502, e.g., at the end of t1, the coolant temperature begins to rise, increasing rapidly and reaching a first peak 504 after a second interval of time t2. The second interval of time t2, beginning when the PTC heater is turned on at the start of t1 and overlapping with t1, may be longer than t1 by, for example, two or three times. The second interval of time t2 may be a time period of 20 to 60 seconds. However, the sharp rise in temperature begins by the end of t1, thus detection of the rise in coolant temperature may be detected part-way through t2 and before the end of t2. For example, confirmation of the rise in coolant temperature may be achieved in less than one minute. The coolant temperature response to the activation pulse 502 may be a spike in temperature, reaching a maximum for a brief period time, such as 1-5 seconds, and immediately decreasing in temperature at a similar rate as the rise in temperature.

By intrusively activating a PTC heater in a heating loop, fluidly coupled to an engine cooling loop via a primary circuit when an engine of a PHEV is operating, a position of an HCIV in the heating loop, configured to control coolant flow through either the primary circuit or a secondary circuit, may be determined efficiently. The secondary circuit is formed from the heating loop, isolated from the engine cooling loop by the HCIV, and flow of coolant through the secondary circuit instead of the primary circuit when the engine is operating may lead to degradation of an EGR cooler, flow of heated coolant to a degas bottle, and termination of EGR flow. A status of the HCIV when flow through the primary circuit is requested may be detected by turning on the PTC heater in short bursts, allowing identification of the HCIV being stuck in a position that decouples the heating loop from the engine cooling loop before degradation of the EGR cooler occurs.

An example of a method 600 for evaluating a position of the HCIV is shown in FIG. 6. Method 600 may be implemented in a coolant system of a PHEV such as the coolant system 200 of FIG. 2, where coolant flows through a primary circuit when the engine is operating and providing torque and an HCIV is actuated to a first position, such as the first position 300 shown in FIG. 3. The coolant flows through a secondary circuit when the PHEV is operating in an electric mode, not utilizing engine torque, and the HCIV is actuated to a second position, such as the second position 400 shown in FIG. 4. The primary circuit may include both an engine cooling loop and a heating loop, the loops coupled to one another by the HCIV adjusted to the first position. A PTC heater is included in the heating loop. The secondary circuit may include the heating loop and not the engine cooling loop, the loops decoupled from one another by adjustment of the HCIV to the second position. In some instances the HCIV may not be able to adjust to the first position when flow through primary circuit is demanded due to degradation of the HCIV. Method 600 may be conducted routinely to evaluate a performance of the HCIV. For example, method 600 may be implemented each time the HCIV is instructed to switch from the second position to the first position. Instructions for carrying out method 600 and the rest of the methods included herein may be executed by a controller based on instructions stored on a memory of the controller and in conjunction with signals received from sensors of the engine system, such as the sensors described above with reference to FIGS. 1 and 2. For example, the controller may receive information from an engine coolant temperature (ECT) sensor positioned in the heating loop, such as the ECT sensor 244 shown in FIG. 2. The controller may employ engine actuators of the engine system to adjust engine operation, according to the methods described below.

Prior to 602, the PHEV is operating, e.g., the engine is not keyed off and a battery of the PHEV is actively powering electrical components of the PHEV. The PHEV may be propelled by engine torque or by electrical energy. For example, the PHEV may be idling or in transit, e.g., travelling and may alternate between operating in an electric mode or a fuel combustion mode. At 602, the method includes determining if the PHEV engine is operating, e.g., actively providing torque. Engine operation may be detected via data received from a MAP sensor to measure a pressure at an intake manifold, from an intake manifold temperature, or from an exhaust sensor to measure an AFR (or lack thereof), etc. If the engine is not determined to be operating, the method continues to 604 to determine if passenger cabin heating is requested. A request for passenger cabin heating may be implemented by an operator turning on a switch or dial at a passenger control console of the PHEV.

If heating is not requested, the method proceeds to 606 to continue operating the PHEV under current operating conditions, e.g., in electric mode, without passenger cabin heating, and with the HCIV in the second position. The method returns to the start. However, if heating is requested at 604, the method continues to 608 to activate the PTC heater in the heating loop to warm coolant flowing through the heating loop, the heat absorbed by the coolant transferred at a downstream heater core to air flowing to the passenger cabin. The method returns to the start.

Returning to 602, responsive to detection of engine operation, the method continues to 610 to initiate a test to diagnose a status of the HCIV by initiating an HCIV test. In order to enable efficient engine and EGR gas cooling, the HCIV is commanded to the first position to flow coolant through the primary circuit when the engine is operating. However, degradation of the HCIV may occur and result in retention of the HCIV in the second position, circulating coolant through the secondary circuit, in spite of the command to adjust the HCIV to the first position. The HCIV test may thus evaluate a condition of the HCIV, e.g., whether the HCIV is able to respond to the command to adjust its position or if the HCIV is stuck in the second position.

Initiating the HCIV test includes activating the PTC heater at 612 for a brief period of time, such as 30 seconds or less, followed by deactivation. In other words, the PTC heater may be pulsed at least one time. In examples, the PTC heater may be pulsed for a preset number of pulse cycles to provide a minimum statistical level of confidence in a status of the HCIV. The preset number of pulse cycles may three cycles, or five cycles, and may be performed at uniform intervals or varying intervals of time. Initiating the HCIV test further includes monitoring the ECT at the ECT sensor at 614. The controller may query the ECT sensor continuously as the PTC heater is pulsed to collect continuous data from the ECT sensor regarding the ECT response to PTC heater pulsing.

At 616, the method includes determining if the time elapsed since initiating the HCIV test reaches or passes a first threshold. The first threshold may be a duration of time that includes both a pulse duration of the PTC heater as well as a period of time to allow an effect of the pulse on ECT to be observable. For example, an inertia and heat capacity of the coolant may result in a hysteresis effect, delaying a detectable change in ECT. The first threshold may therefore be a total of 35, 40, 45 seconds, or a period of time between 30 and 55 seconds, depending on a composition of the coolant. If the elapsed time does not reach the first threshold, the method returns to 616 to continue comparing the elapsed time to the first threshold.

If the elapsed time reaches the first threshold, the method continues to 618 to determine if the ECT reaches or surpasses a second threshold. The second threshold may be a coolant temperature higher than a reference ECT when the PTC heater is not operating. The second threshold may be an elevated temperature that, when attained within the first threshold of time, is indicative of a spike in ECT resulting from the HCIV being stuck in the second position. The second threshold may be, for example, a 20, 40, 50% rise in temperature relative to the reference ECT. The reference ECT may a coolant temperature in the heating loop prior to PTC heater activation, e.g., an ambient coolant temperature in the heating loop. The reference ECT may vary depending on operating conditions of the PHEV, therefore the second threshold may also vary accordingly. When stuck in the second position but commanded to the first position, the HCIV blocks coolant circulation between the engine cooling loop and heating loop while an auxiliary pump in the heating loop is deactivated, enabling ECT to rapidly rise in response to operation of the PTC heater. In contrast, when the HCIV is in the first position when commanded to the first position and the PTC heater is activated, a large hysteresis effect and coolant inertia resulting from flow through the primary circuit may delay a change in the ECT for a longer period of time than the first threshold, such as, for example, more than one minute.

If the ECT does not reach the second threshold, the HCIV is determined to not be degraded and successfully commanded to the first position. The method continues operation of the PHEV at 620 under current operating conditions, such as utilizing fuel combustion for vehicle propulsion and passenger cabin heating (if requested), with the HCIV in the first position. The method returns to the start. Responsive to a determination that the ECT reaches the second threshold and the HCIV is stuck in the second position, the method proceeds to 622 to perform mitigating actions. The mitigating actions may include sending an alert to notify an operator of the status of the HCIV. For example, an alert may be displayed at 624 at a display panel in the passenger cabin. At 626, EGR flow may be reduced or halted to reduce heat transfer from EGR gases to the coolant that may lead to thermal stress at an EGR cooler. Engine operations may be adjusted to compensate for the reduced or lack of EGR flow to maintain emissions below a threshold level of emissions. The threshold level of emissions may be a preset concentration of substances such as CO, $NO_x$, etc., as detected by corresponding sensors in an exhaust manifold of the PHEV. The PTC heater may be activated to provide passenger cabin heating, if heating is requested, to compensate for reduced heat transfer from the EGR gases. The mitigating actions may be continued until the controller is notified that the HCIV is repaired or replaced.

In this way, a status of a heater core isolation valve (HCIV) of a PHEV may be diagnosed by intrusively activating a positive temperature coefficient (PTC) heater. The HCIV may control coolant flow between an engine cooling loop and a heating loop, adjustable between a first position that couples the loops and a second position that decouples the loops. During instances when the HCIV is stuck in the second position while an engine of the PHEV is operating and engine cooling is requested, diagnosis of the HCIV status may be achieved by activating the PTC heater for a brief period of time and observing the engine coolant temperature (ECT) in the heating loop for a spike in the ECT. Generation of the temperature spike may indicate a degraded condition of the HCIV, enabling further mitigating actions, such as alerting and operator, reducing EGR flow, etc., to be performed. Release of undesirable exhaust emissions when the HCIV is stuck as well as thermal degradation of an EGR cooler is reduced.

The technical effect of diagnosing the HCIV status by intrusive activation of the PTC heater is that a likelihood of increased carbon monoxide, nitrogen oxides, particulate matter, and hydrocarbon emission is reduced when the HCIV is degraded and EGR gas cooling is not provided.

In a first embodiment, a method includes while flowing coolant through an engine coolant system, the engine coolant system including a heating loop coupled to a cooling loop via a valve, activating a heater coupled to the heating loop for a duration responsive to a command to adjust the valve to a first position to flow coolant through both the heating loop and the cooling loop, and indicating an actual position of the valve based on a change in coolant temperature in the heating loop following the activating. In a first example of the method, flowing coolant through the engine coolant system includes flowing coolant selectively through the heating loop where coolant flows through the heater, a temperature sensor, and a heater core while bypassing the cooling loop when the valve is commanded to adjust to a second position, different from the first position. A second example of the method optionally includes the first example, and further includes wherein indicating the actual position of the valve includes indicating that the valve is stuck in the second position, following the command to adjust the valve to the first position, responsive to a higher than threshold rise in coolant temperature in the heating loop. A third example of the method optionally includes one or more of the first and second examples, and further includes, wherein the threshold rise in coolant temperature is a predetermined increase in temperature above a temperature of the coolant prior to activating the heater. A fourth example of the method optionally includes one or more of the first through third examples, and further includes, wherein responsive to determining that the HCIV is stuck in the second position, reducing EGR flow to the engine and notifying a vehicle operator.

In another embodiment, a method includes transferring heat from an EGR cooler of an engine cooling loop to a heater core of a heating loop by flowing coolant through both the engine cooling loop and the heating loop, the engine cooling loop coupled to the heating loop by a valve arranged in the heating loop, commanding the valve to a first position based on generation of torque at the engine, activating a positive temperature coefficient (PTC) heater in the heating loop following commanding of the valve to the first position, inferring an actual position of the valve responsive to coolant temperature in the heating loop following heater activation, and indicating valve degradation based on the actual position being different from the commanded position. In a first example of the method, commanding the valve to the first position responsive to using torque generated at the engine to flow coolant through both the engine cooling loop and the heating loop, and commanding the valve to a second position, different from the first position, responsive to using torque generated by an electric motor to flow coolant through only the heating loop. A second example of the method optionally includes the first example, and further includes, wherein commanding the valve to the second position includes flowing coolant from the EGR cooler to a degas bottle in the engine cooling loop and circulating coolant through the heating loop isolated from the cooling loop. A third example of the method optionally includes one or more of the first and second examples, and further includes, wherein indicating valve degradation includes indicating the valve is in the second position responsive to a higher than threshold rise in coolant temperature upon activating the PTC heater following commanding the valve to the first position. A fourth example of the method optionally includes one or more of the first through third examples, and further includes, wherein activating the heater includes heating coolant in the heating loop for less than a threshold duration of time, the threshold duration of time being less than a period of time for a coolant temperature to respond to the heater activation when coolant flows through both the engine cooling loop and the heating loop. A fifth example of the method optionally includes one or more of the first through fourth examples, and further includes, wherein inferring the actual position of the valve includes measuring coolant temperature at a temperature sensor positioned downstream of the PTC heater in the heating loop.

In yet another embodiment, a hybrid vehicle system includes vehicle wheels propelled using torque from one or more of an engine and an electric motor, a coolant system for circulating coolant through the engine, the coolant system including a cooling loop coupled to a heating loop when a valve of the heating loop is in a first position and separated from the heating loop when the valve is in a second position, a positive temperature coefficient (PTC) heater arranged in the heating loop, a temperature sensor arranged downstream of the PTC heater in the heating loop, and a controller with computer readable instruction stored on non-transitory memory that, when executed, cause the controller to activate the PTC heater responsive to a command to adjust the valve to the first position, monitor a change in coolant temperature in the heating loop following heater activation, and diagnose an actual position of the valve based on the monitored change in coolant temperature. In a first example of the system, the cooling loop includes an engine, a radiator, a degas bottle, an engine oil cooler, and an EGR cooler. A second example of the system optionally includes the first example, and further includes wherein the heating loop includes the valve, the PTC heater, the temperature sensor, a heater core downstream of the temperature sensor, and a three-way junction between the valve and the PTC heater. A third example of the system optionally includes one or more of the first and second examples, and further includes, wherein the controller includes further instructions to operate the coolant system in a first mode with the valve in the first position responsive to the wheels using torque from the engine and operate the coolant system in a second mode with the valve in the second position responsive to the wheels using torque from the electric motor. A fourth example of the system optionally includes one or more of the first through third examples, and further includes, wherein when in the first mode, the coolant system is configured to flow coolant from the EGR cooler of the cooling loop to the valve of the heating loop and flow coolant from the three-way junction of the heating loop to the engine oil cooler of the cooling loop. A fifth example of the system optionally includes one or more of the first through fourth examples, and further includes, wherein when in the second mode, the coolant system is configured to circulate coolant within the heating loop, separate from the cooling loop, and flow coolant from the EGR cooler to the degas bottle in the cooling loop. A sixth example of the system optionally includes one or more of the first through fifth examples, and further includes, wherein the controller includes further instructions to diagnose the actual position of the valve responsive to a measurement of coolant temperature in the heating loop above a threshold temperature. A seventh example of the system optionally includes one or more of the first through sixth examples, and further includes, wherein the controller includes further instructions to indicate that the valve is stuck in the first position following measurement of the coolant temperature above the threshold temperature. An eighth example of the system optionally includes one or more of the first through seventh examples, and further includes, wherein the hybrid vehicle is a plug-in hybrid electric vehicle.

In another representation, an engine method includes, during heater core isolation valve diagnostics, activating a positive temperature coefficient heater, and in response to a higher than threshold spike in coolant temperature, indicate valve degradation. In a first example of the method, the positive temperature coefficient heater is activated to provide heating to a passenger cabin with the valve is determined to be degraded.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a plug-in hybrid electric vehicle (PHEV), comprising:

while flowing coolant through an engine coolant system, the engine coolant system including a heating loop coupled to a cooling loop via a heater core isolation valve (HCIV);
determining an actual position of the HCIV by activating a heater coupled to the heating loop for a duration responsive to a command to adjust the HCIV to a first position to flow coolant through both the heating loop and the cooling loop; and
indicating the actual position of the HCIV based on a change in coolant temperature in the heating loop following the activating.

2. The method of claim 1, wherein flowing coolant through the engine coolant system includes flowing coolant selectively through the heating loop where coolant flows through the heater, a temperature sensor, and a heater core while bypassing the cooling loop when the HCIV is commanded to adjust to a second position, and wherein the HCIV comprising a pivotable partition that is adjustable between a first position and a second position, the first position different from the second position.

3. The method of claim 2, wherein indicating the actual position of the HCIV includes indicating that the HCIV is stuck in the second position, following the command to adjust the HCIV to the first position, responsive to a higher than threshold rise in coolant temperature in the heating loop.

4. The method of claim 3, wherein the threshold rise in coolant temperature is a predetermined increase in temperature above a temperature of the coolant prior to activating the heater.

5. The method of claim 3, wherein responsive to determining that the HCIV is stuck in the second position, reducing EGR flow to the engine and notifying a vehicle operator.

6. A method for a vehicle, comprising:
transferring heat from an EGR cooler of an engine cooling loop to a heater core of a heating loop by flowing coolant through both the engine cooling loop and the heating loop, the engine cooling loop coupled to the heating loop by a valve arranged in the heating loop;
commanding the valve to a first position based on generation of torque at the engine;
activating a positive temperature coefficient (PTC) heater in the heating loop following commanding of the valve to the first position;
inferring an actual position of the valve responsive to coolant temperature in the heating loop following heater activation; and
indicating valve degradation based on the actual position being different from the commanded position.

7. The method of claim 6, further comprising commanding the valve to the first position responsive to using torque generated at the engine to flow coolant through both the engine cooling loop and the heating loop, and commanding the valve to a second position, different from the first position, responsive to using torque generated by an electric motor to flow coolant through only the heating loop.

8. The method of claim 7, wherein commanding the valve to the second position includes flowing coolant from the EGR cooler to a degas bottle in the engine cooling loop and circulating coolant through the heating loop isolated from the cooling loop.

9. The method of claim 7, wherein indicating valve degradation includes indicating the valve is in the second position responsive to a higher than threshold rise in coolant temperature upon activating the PTC heater following commanding the valve to the first position.

10. The method of claim 6, wherein activating the heater includes heating coolant in the heating loop for less than a threshold duration of time, the threshold duration of time being less than a period of time for a coolant temperature to respond to the heater activation when coolant flows through both the engine cooling loop and the heating loop.

11. The method of claim 6, wherein inferring the actual position of the valve includes measuring coolant temperature at a temperature sensor positioned downstream of the PTC heater in the heating loop.

12. A hybrid vehicle system, comprising:
vehicle wheels propelled using torque from one or more of an engine and an electric motor;
a coolant system for circulating coolant through the engine, the coolant system including a cooling loop coupled to a heating loop when a valve of the heating loop is in a first position and separated from the heating loop when the valve is in a second position;
a positive temperature coefficient (PTC) heater arranged in the heating loop;
a temperature sensor arranged downstream of the PTC heater in the heating loop; and
a controller with computer readable instruction stored on non-transitory memory that, when executed, cause the controller to:
activate the PTC heater responsive to a command to adjust the valve to the first position;
monitor a change in coolant temperature in the heating loop following heater activation; and
diagnose an actual position of the valve based on the monitored change in coolant temperature.

13. The hybrid vehicle system of claim 12, wherein the cooling loop includes an engine, a radiator, a degas bottle, an engine oil cooler, and an EGR cooler.

14. The hybrid vehicle system of claim 13, wherein the heating loop includes the valve, the PTC heater, the temperature sensor, a heater core downstream of the temperature sensor, and a three-way junction between the valve and the PTC heater.

15. The hybrid vehicle system of claim 14, wherein the controller includes further instructions to operate the coolant system in a first mode with the valve in the first position responsive to the wheels using torque from the engine and operate the coolant system in a second mode with the valve in the second position responsive to the wheels using torque from the electric motor.

16. The hybrid vehicle system of claim 15, wherein when in the first mode, the coolant system is configured to flow coolant from the EGR cooler of the cooling loop to the valve of the heating loop and flow coolant from the three-way junction of the heating loop to the engine oil cooler of the cooling loop.

17. The hybrid vehicle system of claim 16, wherein when in the second mode, the coolant system is configured to circulate coolant within the heating loop, separate from the cooling loop, and flow coolant from the EGR cooler to the degas bottle in the cooling loop.

18. The hybrid vehicle system of claim 12, wherein the controller includes further instructions to diagnose the actual position of the valve responsive to a measurement of coolant temperature in the heating loop above a threshold temperature.

19. The hybrid vehicle system of claim 18, wherein the controller includes further instructions to indicate that the valve is stuck in the first position following measurement of the coolant temperature above the threshold temperature.

20. The hybrid vehicle system of claim 12, wherein the hybrid vehicle is a plug-in hybrid electric vehicle.

\* \* \* \* \*